United States Patent [19]

Yokev et al.

[11] Patent Number: 5,583,517

[45] Date of Patent: Dec. 10, 1996

[54] MULTI-PATH RESISTANT FREQUENCY-HOPPED SPREAD SPECTRUM MOBILE LOCATION SYSTEM

[75] Inventors: Hanoch Yokev, Ramat-Gan; Haim Harel, Herzelia; Yehouda Meiman, Rishon Letzian; Shimon Peleg, Hod Hasharon, all of Israel

[73] Assignee: Nexus 1994 Limited, London, England

[21] Appl. No.: 329,523

[22] Filed: Oct. 26, 1994

Related U.S. Application Data

[63] Continuation-in-part of Ser. No. 158,441, Nov. 24, 1993, Pat. No. 5,430,759, which is a continuation-in-part of Ser. No. 961,776, Oct. 15, 1992, Pat. No. 5,335,246, which is a continuation-in-part of Ser. No. 932,610, Aug. 20, 1992, abandoned.

[51] Int. Cl.$^6$ ..................................................... G01S 3/02
[52] U.S. Cl. .......................... 342/457; 342/465; 342/442; 342/446
[58] Field of Search .................................... 342/457, 465, 342/442, 446

[56] References Cited

U.S. PATENT DOCUMENTS

| 2,437,695 | 3/1948 | Jansky . |
| 3,445,847 | 5/1969 | Hammack . |
| 3,747,104 | 7/1973 | Pansini . |

(List continued on next page.)

FOREIGN PATENT DOCUMENTS

| 9001089 | 4/1992 | France . |
| 58-28675 | 2/1983 | Japan . |
| WO88/01750 | 3/1988 | WIPO . |
| WO89/12835 | 12/1989 | WIPO . |

OTHER PUBLICATIONS

Ernest Jacobs et al., "Ambiguity Resolution in Interferometry," *IEEE Transactions on Aerospace and Electronic Systems*, 17, No. 6, pp. 776/780 dated Nov., 1981.

Mati Wax, et al., "Decentralized Processing in Sensory Arrays," *IEEE Transactions on Acoustics, Speech and Signal Processing, ASSP–33*, No. 4, pp. 1123–1129, dated Oct. 1985.

Primary Examiner—Theodore M. Blum
Attorney, Agent, or Firm—Schwegman, Lundberg, Woessner & Kluth, P.A.

[57] ABSTRACT

A multi-path resistant frequency-hopped spread spectrum mobile vehicle or personal location system is described which provides low cost manufacture and low power operation while still enabling the accurate location of the mobile unit over long distances and in moderate to severe multi-path conditions. The frequency-hopped spread spectrum mobile vehicle or personal location system consists of a central station, a plurality of base stations and a plurality of mobile transmitters which transmit using a frequency-hopped spread-spectrum differential bi-phase shift keying communication signal. Frequency Shift Keying modulation may also be used. Each of the plurality of base stations include an array of receiving dipole antennas and employs special algorithms for retrieving very low power frequency-hopped spread spectrum signals in a noisy and multi-path environment. The base stations use computational algorithms for determining the phase difference between each of receiving dipole antennas to determine the direction of the transmitter relative to the location of the respective base station. The multiple direction of arrival angles of the received signal at each base station are corrected based on an n-dimensional ambiguity space to locate most probable angles of arrival. The ambiguity space plot is used to eliminate erroneous comparisons of dissimilar phases of the incoming signal. The most probable values are then tracked over multiple frequency hops and a histogram analysis of the strongest surviving angles of arrival is performed. The two peaks of the histogram are used as the two most probable directions of arrival. Each base station then communicates the two relative directions of the transmitter to a central station where the location of the transmitter is determined by triangulation. The direction of arrival angles from the multiple base stations are summed in a least mean square approach to find a single direction of arrival which is then plotted on a gnomonic projection to correct for the curvature of the earth.

7 Claims, 8 Drawing Sheets

U.S. PATENT DOCUMENTS

| | | | |
|---|---|---|---|
| 3,864,681 | 2/1975 | Olive | 343/112 |
| 3,886,554 | 5/1975 | Braun et al. | 343/112 |
| 3,972,042 | 7/1976 | Johnson | 343/17.2 |
| 4,114,155 | 9/1978 | Raab | 343/105 |
| 4,188,629 | 2/1980 | Johnson | 343/6.5 |
| 4,217,586 | 8/1980 | McGuffin | 343/100 |
| 4,229,620 | 10/1980 | Schaible | 179/2 |
| 4,316,191 | 2/1982 | Sawatari et al. | |
| 4,369,426 | 1/1983 | Merkel | 340/32 |
| 4,443,801 | 4/1984 | Klose et al. | 342/442 |
| 4,449,127 | 5/1984 | Sanchez | 343/7 |
| 4,494,119 | 1/1985 | Wimbush | 343/457 |
| 4,589,078 | 5/1986 | Rosenberg | 364/524 |
| 4,596,988 | 6/1986 | Wanka | 343/457 |
| 4,626,859 | 12/1986 | Stansfield | 342/442 |
| 4,665,379 | 5/1987 | Howell et al. | 340/63 |
| 4,665,404 | 5/1987 | Christy et al. | 342/463 |
| 4,698,781 | 10/1987 | Cockerell, Jr. | 364/561 |
| 4,728,959 | 3/1988 | Maloney et al. | 342/457 |
| 4,740,792 | 4/1988 | Sagey et al. | 342/457 |
| 4,742,357 | 5/1988 | Rackley | 342/457 |
| 4,791,572 | 12/1988 | Green, III et al. | 364/449 |
| 4,891,650 | 1/1990 | Sheffer | 342/457 |
| 4,905,271 | 2/1990 | Namekawa | 379/58 |
| 5,003,317 | 3/1991 | Gray et al. | 342/457 |
| 5,021,794 | 6/1991 | Lawrence | 342/457 |
| 5,055,851 | 10/1991 | Sheffer | 342/457 |
| 5,081,667 | 1/1992 | Drori et al. | 379/59 |
| 5,099,245 | 3/1992 | Sagey | 342/357 |
| 5,218,367 | 6/1993 | Sheffer et al. | 342/457 |
| 5,311,197 | 5/1994 | Sorden et al. | 342/457 |
| 5,317,323 | 5/1994 | Kennedy et al. | 342/457 |
| 5,327,144 | 7/1994 | Stilp et al. | 342/387 |
| 5,365,451 | 11/1994 | Wang et al. | 364/449 |
| 5,372,411 | 12/1994 | Gerstenmaier et al. | 303/100 |
| 5,379,047 | 1/1995 | Yokev et al. | 342/457 |
| 5,396,540 | 3/1995 | Gooch | 379/59 |

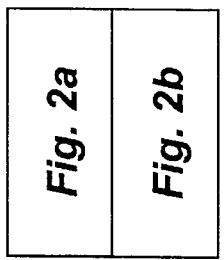
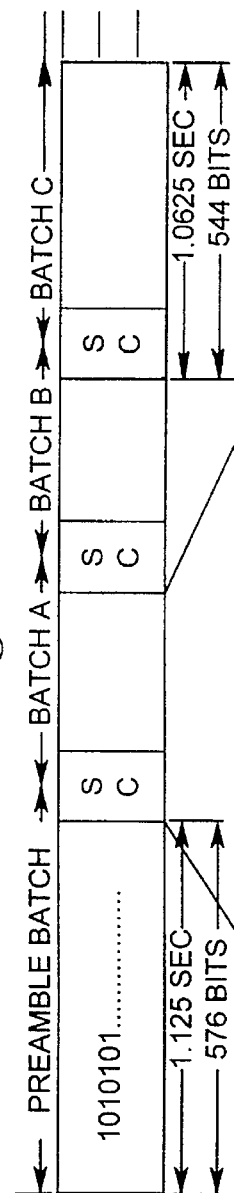
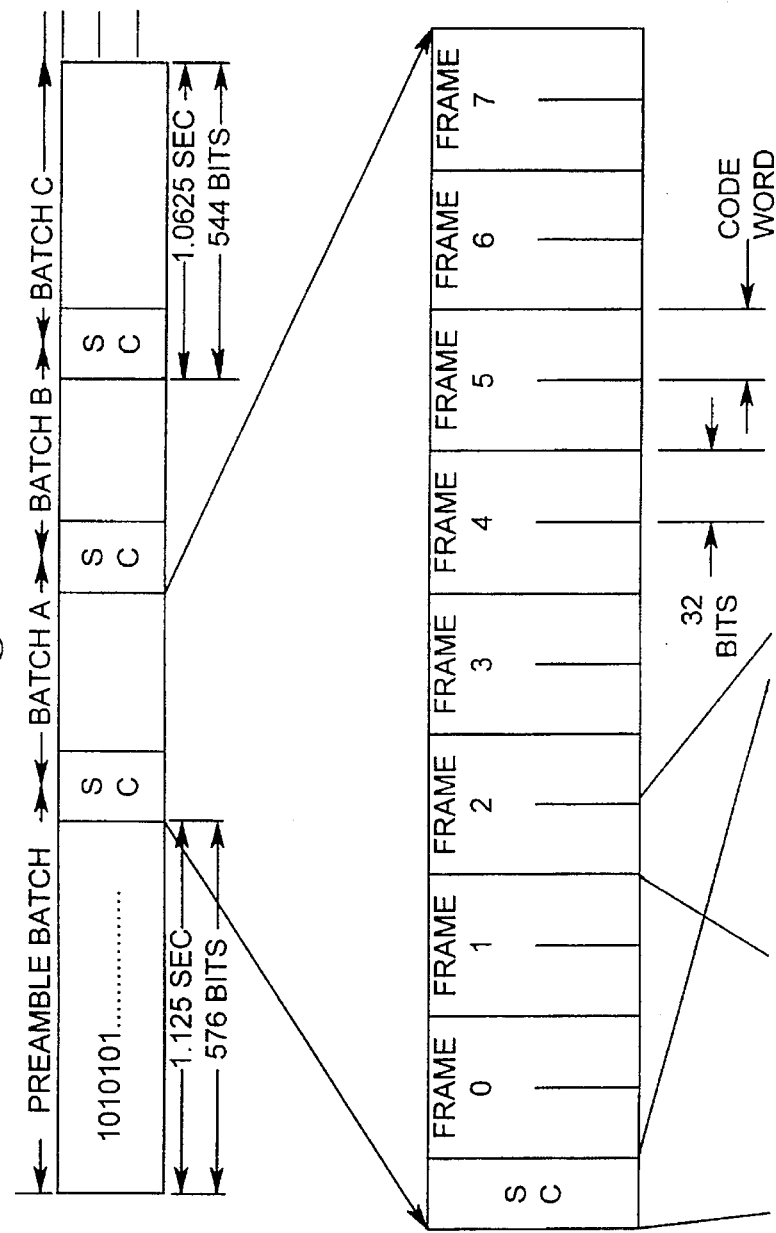

MULTI-PATH RESISTANT FREQUENCY-HOPPED SPREAD SPECTRUM MOBILE LOCATION SYSTEM

The present patent application is a continuation-in-part of U.S. Pat. No. 5,430,759, issued Jul. 4, 1995 entitled "LOW-POWER FREQUENCY-HOPPED SPREAD SPECTRUM ACKNOWLEDGMENT PAGING SYSTEM" (U.S. Pat. No. 5,430,759), which in turn is a continuation-in-part of U.S. Pat. No. 5,335,246, issued Aug. 2, 1994 entitled "PAGER WITH REVERSE PAGING FACILITY" (U.S. Pat. No. 5,335,246), which in turn is a continuation-in-part of U.S. patent application Ser. No. 07/932,610 (now abandoned) entitled "REMOTE POSITION DETERMINATION" filed Aug. 20, 1992, all of which, including the microfiche appendices, are hereby incorporated by reference.

FIELD OF THE INVENTION

The present invention relates generally to radio communication systems and in particular the present invention relates to vehicle or mobile locators using frequency hopped spread spectrum communication in a multi-path environment.

BACKGROUND OF THE INVENTION

Location of radio transmitters is a technology that has been used for many years and in many applications. In general, radio direction finding is classified into many subclasses using a variety of direction finding tools such as antenna loops and antenna arrays. For radio location, the use of mobile transmitters and a plurality of fixed base station receivers is generally known in the art where the fixed receivers locate the source of the radio signal by triangulation of the radio signals. In the alternative, a plurality of fixed base stations may transmit radio signals and a mobile receiver may determine its own position.

Triangulation is a technique where the fixed base station receivers each determine the approximate direction of the radio signal from the transmitter. The approximate direction lines are then drawn on a map where the lines will cross. Since the direction lines are approximate, and typically three fixed base station receivers are used, the intersecting area between the three lines is usually shaped like a triangle since the lines rarely meet at a single point. The transmitter is then located within the triangle. Triangulation of radio signals is fraught with uncertainty. Propagation interference, signal drop out, insufficient transmitter power, ambiguity in beating measurements received from behind the receiving antennas and multi-path reflections are common sources of errors and uncertainty in radio direction finding and location.

Vehicle location systems are known in the art which use a variety of direction finding and location techniques. One example of a vehicle location system is U.S. Pat. No. 4,740,792 to Sagey et al. which describes a mobile transmitter and a plurality of satellite receivers. A central site determines the location of the mobile transmitters by calculating the difference in the arrival time of the spread spectrum transmitter signals at the satellites. This system may be used, for example, for the anti-theft location of stolen vehicles or the location individuals carrying the transmitters.

In the alternative, a plurality of fixed base stations may transmit radio signals and a mobile receiver may determine its own position as for example in Loran-C or Global Positioning Satellite Systems. One of these types of systems is exemplified in U.S. Pat. No. 4,665,404 to Christy et al. which describes the use of spread spectrum radio transmitters at fixed locations and mobile receivers. The receivers locate their own position by accurately measuring the time at which the radio signals are received to determine the range from the transmitters.

There is a need in the art for a ground-based vehicle or mobile transmitter location system which locates a large number of small, low-power transmitters and which operate without confusion or collision. There is a further need for a ground-based mobile transmitter location system which is immune from multi-path disruption of the radio signals in an urban or irregular terrain environment. There is a further need for a ground-based mobile transmitter location system which is capable of carrying messages or identification signals simultaneous with the location of the transmitter.

For the reasons stated above, and for other reasons stated below which will become apparent to those skilled in the art upon reading and understanding the present specification, there is a need in the art for a low-power, spread spectrum vehicle or personal locator system which operates effectively in moderate to severe multi-path conditions without collisions of simultaneous messages from a plurality of transmitters.

SUMMARY OF THE INVENTION

The above mentioned problems with vehicle or personal locators and other problems are addressed by the present invention and which will be understood by reading and studying the following specification. The present invention is a ground-based vehicle, mobile or personal transmitter location system which locates any one of a large number of small, low-power, frequency hopping spread spectrum transmitters and which operate without confusion or collision of the received signals. The present invention is immune from multi-path disruption of the radio signals in an urban or irregular terrain environment is capable of carrying messages or identification signals simultaneous with the location of the transmitter.

The present invention consists of a central station, a plurality of base stations and a plurality of mobile transmitters which transmit using a frequency-hopped spread-spectrum communication signal. The communication signal may be modulated using differential bi-phase shift keying, or frequency shift keying, or the like. Each of the plurality of base stations include an array of receiving dipole antennas and employs special algorithms for retrieving very low power frequency-hopped spread spectrum signals in a noisy and multi-path environment. The base stations use computational algorithms for determining the phase difference between each of receiving dipole antennas to determine the direction of the transmitter relative to the location of the respective base station. The multiple direction of arrival angles of the received signal at each base station are corrected based on an n-dimensional ambiguity space to locate most probable angles of arrival. The ambiguity space plot is used to eliminate erroneous comparisons of dissimilar phases of the incoming signal. The most probable values are then tracked over multiple frequency hops and an histogram analysis of the strongest surviving angles of arrival is performed. The two peaks of the histogram are used as the two most probable directions of arrival. Each base station then communicates the two relative directions of the transmitter to a central station where the location of the transmitter is determined by triangulation. The direction of arrival angles from the multiple base stations are summed in a least mean square approach to find a single direction of arrival which is then plotted on a gnomonic projection to correct for the curvature of the earth.

BRIEF DESCRIPTION OF THE DRAWINGS

In the drawings, where like numerals refer to like components throughout the several views.

DETAILED DESCRIPTION OF THE PREFERRED EMBODIMENT

Figure 1:
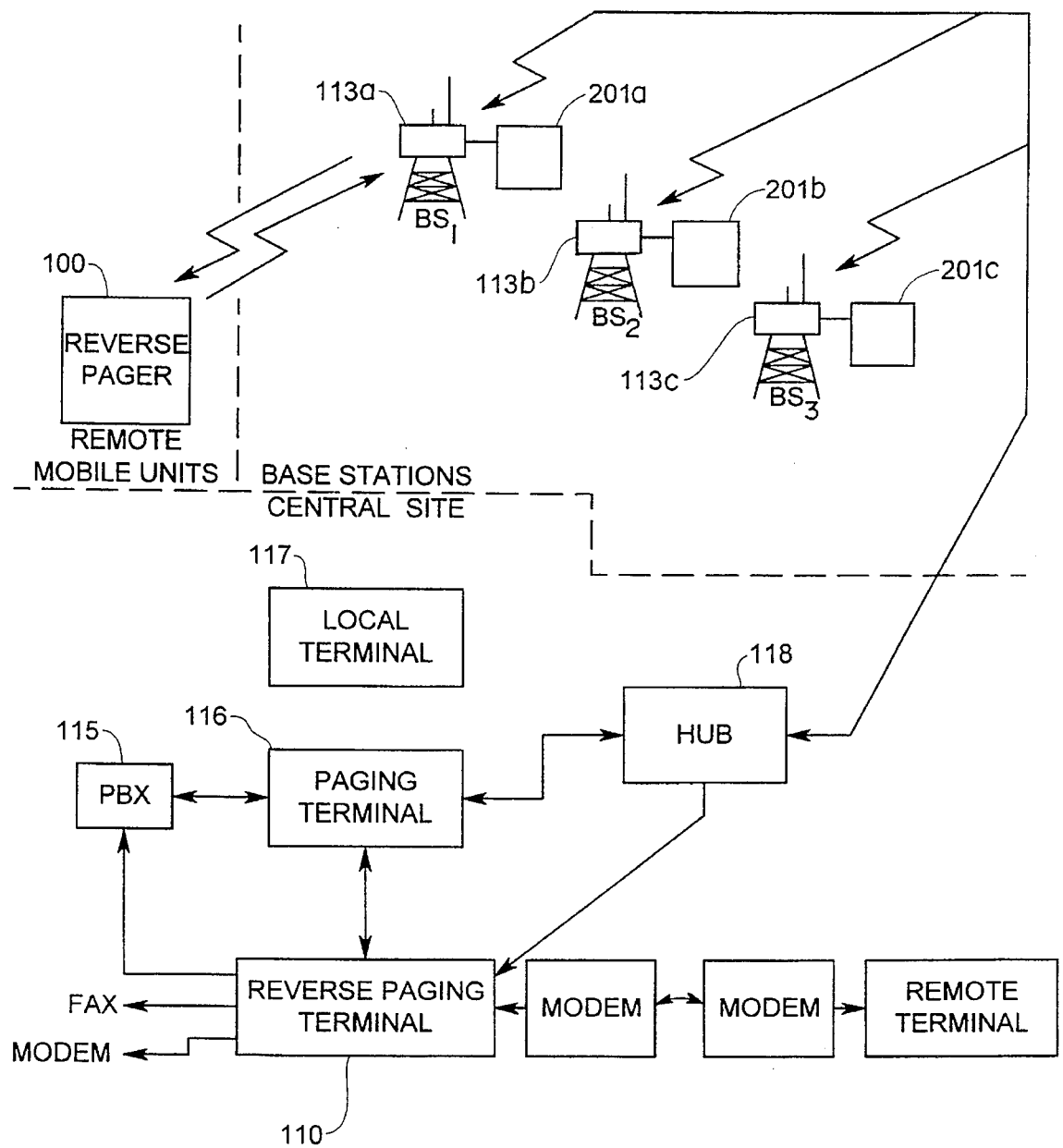
FIG. 1 is an overview of the infrastructure of the multi-path resistant frequency-hopped spread spectrum mobile location system.

The specification for the present invention described herein includes the present description, the drawings, and claims. The present specification also includes the descriptions, drawings, claims as filed and appendices of U.S. Pat. No. 5,430,759, issued Jul. 4, 1995 entitled "LOW-POWER FREQUENCY-HOPPED SPREAD SPECTRUM ACKNOWLEDGMENT PAGING SYSTEM" U.S. Pat. No. 5,335,246, issued Aug. 2, 1994 entitled "PAGER WITH REVERSE PAGING FACILITY" and U.S. patent application Ser. No. 07/932,610 entitled "REMOTE POSITION DETERMINATION" filed Aug. 20, 1992, all of which are incorporated by reference.

In the following detailed description of the preferred embodiment, reference is made to the accompanying drawings which form a part hereof, and in which is shown by way of illustration specific preferred embodiments in which the inventions may be practiced. These embodiments are described in sufficient detail to enable those skilled in the art to practice the invention, and it is to be understood that other embodiments may be utilized and that structural, logical and electrical changes may be made without departing from the spirit and scope of the present inventions. The following detailed description is, therefore, not to be taken in a limiting sense, and the scope of the present inventions is defined only by the appended claims.

The present invention is directed to a location system for use in locating remote mobile units. The remote mobile units may be located in motor vehicles, located on the person of people, carded within containers or packages, or any number or variety of mobile carriers. The location system comprises a plurality of base stations (at least two) which transmit signals to the remote mobile units and receive signals from the remote mobile units. The base stations may send messages and information to the remote mobile units, or the base stations may simply send alert or interrogation commands to activate the remote mobile units. Thus the remote mobile units may be activated locally (for example by the wearer or vehicle) or remotely by the base station. The remote mobile units may be used by a person as a reverse pager, as an emergency locator or as a communication device. The remote mobile units may also be used as part of a vehicle to locate the vehicle if stolen, in an accident, for vehicle tracking or as an integral communication device.

The remote mobile units receive messages as a standard paging device over licensed airwaves using a standard paging infrastructure. The remote mobile units, when activated, transmit low-power (less than one watt), frequency-hopped, spread-spectrum communication signals. The transmitted signals from the remote mobile units are received by the base stations which are then used to locate the remote mobile units. The base stations are equipped with an array of irregularly-spaced dipole receiving antennas and a reference antenna (optional). The direction of the received signals from the remote mobile units is determined by interferometric direction finding using phase difference comparisons between the various dipoles of the array. Unique algorithm using histogram analysis and spatial filtering are performed on the received signals at the base stations to eliminate the ambiguity caused by signal interference, signal drop out, ambiguity in bearing measurements received from behind the receiving antennas and multi-path reflections.

System Overview

In the preferred embodiment of the present invention, the transmitters and base stations of the present invention are as described in the aforementioned U.S. Pat. No. 5,420,759, issued Jul. 4, 1995 entitled "LOW-POWER FREQUENCY-HOPPED SPREAD SPECTRUM ACKNOWLEDGMENT PAGING SYSTEM". The infrastructure of this acknowledgement paging systems serves as the basis of the present invention and the reverse pagers of this acknowledgement pager system operate identically in the present system. The present invention allows the accurate location of the reverse pagers even in noisy and multi-path environments such as those found in urban environments and irregular terrain environments.

FIG. 1 depicts the major components of the two-way paging system in the aforementioned copending U.S. Pat. No. 5,430,759, issued Jul. 4, 1995 entitled "LOW-POWER FREQUENCY-HOPPED SPREAD SPECTRUM ACKNOWLEDGMENT PAGING SYSTEM" filed Nov. 24, 1993. In the preferred embodiment of the present invention, all of the components of the existing paging system of FIG. 1 are used. The reverse paging terminal 110 at the central site operates to provide synchronization and messaging information through the paging terminal 116 to the reverse pagers 100 (also known as remote mobile units 100) via direct links to the base stations $BS_1$, $BS_2$ and $BS_3$ through ground based radio links (not shown) or through a satellite uplink/downlink using a geostationary satellite (not shown). The base stations $BS_1$, $BS_2$ and $BS_3$ include transmit and receive towers 113a, 113b and 113c, respectively and base station terminals 201a, 201b and 201c, respectively. Terminals 201a–201c are required for producing the accurate synchronization information needed to be transmitted to the remote mobile units and for local processing of the received messages for direction finding. This synchronization information is used to coordinate the response of messaging from the plurality remote mobile units 100 so as to minimize collisions within groups of remote mobile units and eliminate collisions between groups of remote mobile units.

Base to Remote Synchronization

Figure 2B:
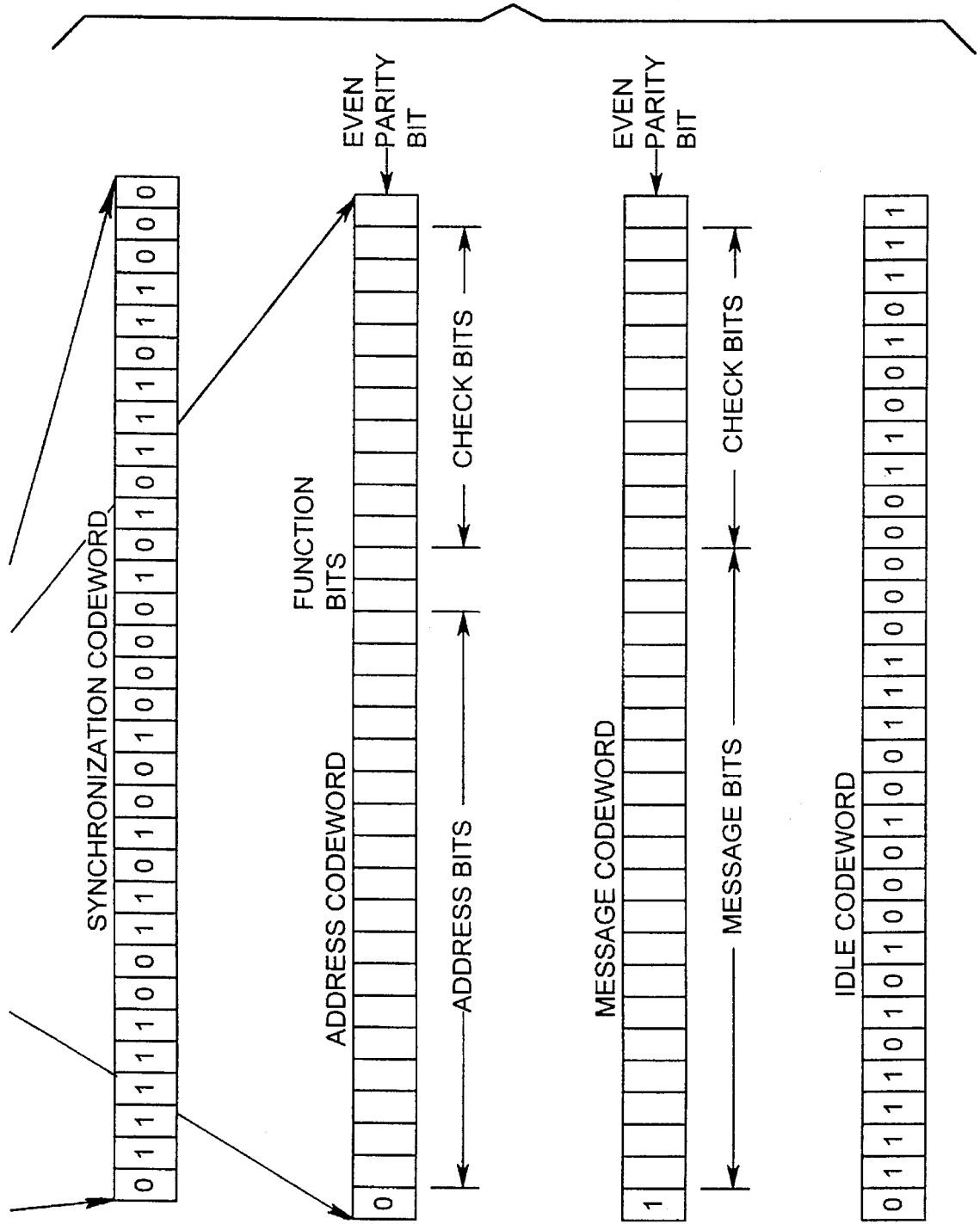
FIG. 2 describes the synchronization and message format of the outgoing paging signals from the base stations.

Standard paging messages sent from the base stations $BS_1$, $BS_2$ and $BS_3$ to the plurality of remote mobile units 100 are, in the preferred embodiment, sent as digital data encoded in the POCSAG paging standard. These messages may be used to interrogate the remote mobile units to activate the remote mobile unit to allow the base stations to begin the location process. Typically the paging channel has a center frequency of 143.160 MHz, with an NRZ FSK data rate of 512 bps or 1200 bps. Other bit rates such as 2400 baud (bps) are also feasible. FIG. 2 describes the POCSAG paging communications protocol as modified for use by the preferred embodiments of the present invention. In the top line of FIG. 2, a greatly compressed time line of digital data transmitted according to the POCSAG protocol is shown. Batches of messages are transmitted in groups as shown in the details in the subsequent lines below the top line of FIG. 2. In the second line of FIG. 2, a 1.0625 second interval (for 512 baud) is shown in which 544 bits are transmitted as a single batch. The batch is preceded by a synchronization code word SC as shown in the third line of FIG. 2. This synchronization code word is used to get the attention of remote mobile units 100 in the geographic locale serviced by the paging terminal.

The synchronization code word within each batch is followed by eight frames of digital data. Each frame is divided into two portions, an address portion and a message portion. The address code word of the message of frame 2 of FIG. 2 is shown in line 4 while the message code word of the second half of frame 2 is shown in line 5. The address code word is preceded by a digital zero followed by 18 address bits, two function bits and 10 check bits. The address code word is followed by an even parity bit. The message code word portion of the flame is preceded by a digital one followed by 20 message bits which are followed by 10 check bits and a single even parity bit. Thus each frame is comprised of 64 bits divided into two 32 bit sections.

Synchronization of the base station terminal 200 and the remote mobile units 100 is necessary to ensure the units 100 are transmitting at the same time that the base stations are listening. Synchronization is also necessary to coordinate the division of the large number of remote mobile units into groups so that members of one group use different frequency hopping patterns from members of other groups. Synchronization of the remote mobile traits 100 is accomplished by inserting a special frame into the POCSAG data which is used to synchronize the units.

Synchronization between the reverse paging terminal 110 and the remote mobile units 100 is accomplished on two levels. Synchronization of the remote mobile units within groups of remote mobile units determine where along the pseudo random noise code the frequency hops are to be followed. For example, within a single group of remote mobile units, all of the remote mobile units within that group will be synchronized to begin transmitting at the same location in the pseudo random noise code list for any acknowledgement which may be required. Synchronization information is sent from the reverse paging terminal periodically to the addresses of each of the remote mobile units within each group to remind the remote mobile units 100 where along the pseudo random noise code they should be tracking. This also enables the dynamic changing of a remote mobile units group membership such that if one group is experiencing a large number of collisions due to simultaneous transmissions, the reverse paging terminal 110 may re-allocate some of the remote mobile units within that group to new groups to minimize collisions.

Another form of synchronization is required to synchronize the remote mobile units to the exact times for transmitting frequencies from within any of the hops. This fine synchronization information, described more fully below, is transmitted as part of the POCSAG codes.

Referring once again to FIG. 2, eight frames of information are transmitted in each burst using the POCSAG format. Remote mobile units 100 may be assigned to a specific frame within the transmission so that the remote mobile units, once recognizing the synchronization code word, can scan a specific frame for that remote mobile unit's address. Once the address is found, the remote mobile unit can determine any group changes that may be required to re-allocate that remote mobile unit to a different group. In addition, the POCSAG format is used to transmit a fine time synchronization code. The fine synchronization code is a transmission of a time pulse at an exact time synchronized to a GPS (Global Positioning System) dock to synchronize all the remote mobile units 100 for time of transmission. For example, periodically during the day the reverse paging terminal will send a synchronization code within the POCSAG code word which is sent at a very precise time. In order to ensure that a precise time pulse is sent, the reverse paging terminal 110 receives accurate time information using a GPS antenna to receive accurate time of day information. The time used to send the synchronization pulse is when the day clock reaches exactly some multiple of 0.9 seconds in the preferred embodiment. In this synchronization information, 20 bits of information are transmitted to give the accurate time of day information.

In each of the remote mobile units 100, the microprocessor compares this accurate time pulse which will indicate the exact time of day and compare it to its own day clock. The clock within each microprocessor is accurate down to a few milliseconds, but the time at which the synchronization pulse occurs should have a resolution much finer than that such as down to 0.1 milliseconds for time of day. In this fashion, each of the microprocessors in each of the remote reverse paging devices can periodically realign its day clock to know within a millisecond the exact time. Each microprocessor does not actually realign its clock but changes a clock offset within memory so that it understands how far off its own internal clock is and can make the adjustment when using that clock to determine when to start transmitting information using the eight frequency hopped spread spectrum signal.

The synchronization pulse is only transmitted every few minutes. However, the resolution of the start of the message indicating the synchronization pulse is very accurate, it being transmitted at 0.090000 seconds GPS time after a fixed time of day, such as 12:00 GMT. This GPS time is accurate to at least within 100 nanoseconds.

Figure 3:
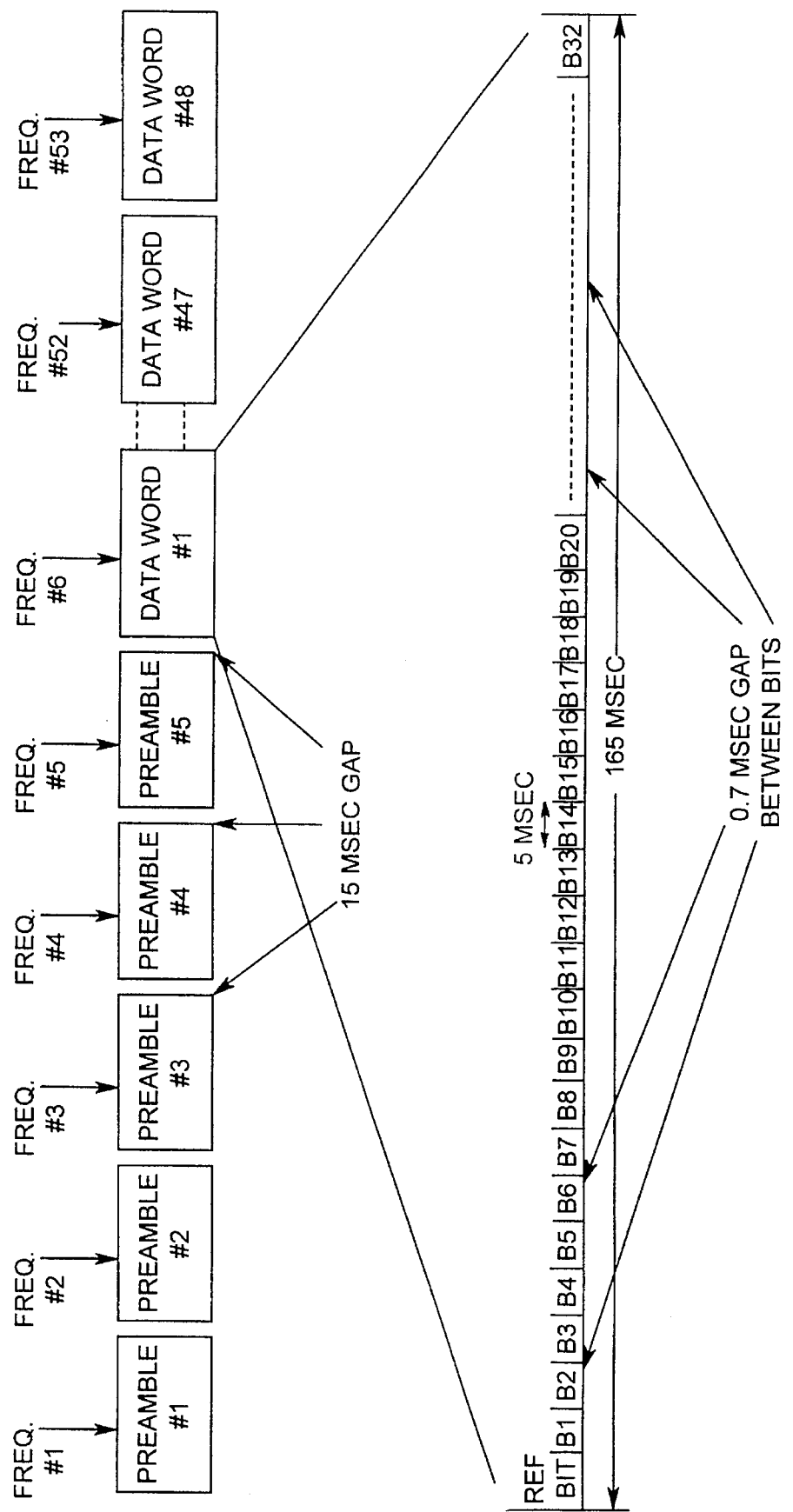
FIG. 3 describes the format of the frequency-hopped spread spectrum signal transmitted by the remote mobile units.

An overview of the transmission format of the remote mobile unit is shown in FIG. 3. The actual transmission of information from the remote mobile units 100 is done using Differential Bi-Phase Shift Keying (DBPSK) modulation on a frequency hopped carrier of less than one watt. The transmission of information from the remote mobile units 100 on the frequency hopped carrier may also be done using Frequency Shift Keying (FSK) modulation. Typically a single transmission consists of 53 hops or 53 changed frequencies selected from a list of narrow band frequencies. The frequency selection is based on a pseudo-random noise code list pointing to the frequency selection list. The synchronization information tells the remote mobile unit 100 where along the pseudo random noise code it should be synchronized for transmission of its message and the fine synchronization information tells exactly the time of day so that the remote mobile unit 100 knows exactly when to start transmitting the specific frequency so that the reverse paging terminal 110 is looking for that frequency at the same time.

In operation, 200 frequencies are used by the remote mobile unit 100 and the base stations and internally stored in a list numbered F1 through F200. For a specific message, 53 frequencies will be used to transmit the entire message. These 53 frequencies are selected based on a 1,000 member pseudo-random noise code.

The use of the accurate synchronization signal periodically broadcast via the outbound paging signal enables the remote mobile units to use lower accuracy components thus reducing the manufacturing cost of remote mobile units. For example, high accuracy crystals to track the time of day within the microprocessor are available with an accuracy of three parts per million. Thus, a time drift of approximately three micro seconds per second or 180 microseconds in a minute is the known drift. There are also time inaccuracies which are introduced due to the time of transmission (variable path length) from the source from the reverse paging terminal when the synchronization information is sent. By employing crystals which are cheaper and have an accuracy of the order 50 parts per million, the amount of time-of-day drift normally wouldn't be tolerable. However, by using the synchronization information transmitted on a regular basis from the reverse paging terminal, the microprocessor can continually correct its own internal day clock so that accurate time of day measurements are always maintained. The microprocessor estimates the momentary inaccuracy of the crystal by tracking the drift across several synchronization transmissions and dynamically adjusts for the frequency drift of the crystal and the offset using internal offset registers for accurate time of day information.

Counters are employed within each microprocessor of the reverse paging units to compensate for the offset of the frequency based on the synchronization time information. There are generally two major factors which affect the drier in a crystal: temperature and acceleration. Most of the drift is due to temperature, and the remaining drift components are negligible. The frequency drift in a crystal due to temperature is very slow, on the order of 50 Hz over 10 seconds. During a single day the temperature can change by 20 or 30 degrees fahrenheit, requiring a time update from the GPS clock approximately every five minutes.

Remote Mobile Unit Transmission Format

The signal sent from the remote mobile unit 100 to the base stations is a spread-spectrum, frequency-hopped transmission using differential bi-phase shift keying (DBPSK) modulation on the frequency-hopped carrier to transmit digital information. The transmission of information from the remote mobile units 100 on the frequency hopped carrier may also be done using Frequency Shift Keying (FSK) modulation. The frequency hops are relatively slow, the frequencies transmitted are very narrow and the transmission power is extremely small. The maximum peak output power of transmission from remote mobile unit 100 is limited to less than one watt to allow use of the 902–928 MHz band in the United States without the need for licensing the paging transmitters as allowed by FCC regulations defined in 47 C.F.R. §15.247, which is hereby incorporated by reference. Those skilled in the art will readily recognize that other frequency bands and transmissions power levels may be employed depending upon FCC licensing requirements or other frequency licensing requirements of other nationalities.

The use of an accurate crystal to control each frequency of transmission is required within each remote mobile unit 100. For example, high accuracy crystals to transmit the narrow bandwidth frequencies used for the frequency hopped transmissions are available with an accuracy of three parts per million. At 900 MHz, a 3 ppm drift would place a single frequency somewhere within a 2.7 KHz band. To tolerate frequency drift due to aging and temperature, each individual frequency of the frequency hopped signal is allocated to a 7.5 KHz band or channel, even though the actual frequency is on the order of 200 Hz wide skirt within this 7.5 KHz allocated bandwidth. Those skilled in the art will readily recognize that by using alternate components, the frequency channels (individual frequency of the frequency hopped signals) of 7.5 KHz allocated bandwidth may be wider or more narrow depending upon the overall allocated bandwidth for the system For example, 1 KHz or less bands may alternatively be allocated per channel.

Tests on this invention have shown that by processing the received signals at the base stations entirely in the digital domain using the combination of unique Fast Fourier Transform algorithms of the present invention to locate and retrieve the frequency hops and by using a combination of unique confidence algorithms with a plurality of error correction codes, the receiving base station is able to pull the response information from a very low power signal from a distance of up to 45 kilometers (28 miles) in a flat terrain. In a rather noisy urban environment, a range of 24 kilometers (15 miles) is the norm. The information within the signals is accurately decoded even though direction of the incoming signals may be severely distorted due to multi-path reflections and noise.

As shown in Table 1, the remote mobile unit message format consists of a preamble and the message body spanning a total of 53 frequency hops. Those skilled in the art will readily recognize that longer messages may be transmitted using the preferred embodiment of the present invention, and the messages format described here is illustrative but not limiting. Since FCC regulations defined in 47 C.F.R. §16.247 require a minimum of 50 frequency hops, the 53 hop message format described here is considered a short message hop. Much longer message hops to transfer more digital data is also implemented but not described here. Of course, those skilled in the art will readily recognize that shorter messages than those described below are equally possible for the preferred embodiments of the present invention. The message length and number of transmission hops are a matter of design choice.

The message preamble consists of a predefined code of ones and zeros to get the attention of the base unit receiver to begin its FFT (Fast Fourier Transform) routines to begin piffling the message out of the noise. The preamble consists of 165 bits transmitted across 5 hops, that is, transmitted using DBPSK (Differential Bi-Phase Shift Keying) or Frequency Shift Keying (FSK) on five different frequencies selected from the frequency list with the specific frequencies selected based on the PN (Pseudo-random Noise) Code list stored within the remote mobile unit. The sequence location within the PN code that the remote mobile unit will begin to follow is based on the synchronized time of day. Within a single hop (a single carrier frequency), the carrier phase is modulated 33 times to encode the predefined one-zero pattern of the preamble.

The message body follows the preamble and consists of three groups of data. Each group consists of 30 actual data bits so that the entire message is, in the preferred embodiment of the present invention, 90 total data bits (although other bit length messages may be chosen). The actual data encoded within these 90 bits is described above and may be in any convenient coded format. Those skilled in the art will readily recognize that a wide variety of message formats and encoding of the data bits may be used without departing from the spirit and scope of the present invention. The encoding described here, however, has been proven effective in retrieving the data bits buried in background noise with a high degree of accuracy and a low actual error rate.

Inner Coding and Interleaving

The inner coding of the message will protect the integrity of the message with an error rate as high as 25% Each block of 64 bits of data (corresponding to a groups of 30 bits and earlier encoded by a standard 30,63 BCH code) is split into two sub-blocks of 32 bits (sub-blocks A and B of Table 2), and a reference bit is added to each sub-block to assist the differential encoding to provide a reference bit to the DBPSK or FSK decoder. The 33 bit sub-blocks are transmitted over one frequency hop each and are replicated 8 times so that the 64-bit block traverses 16 frequency hops. In transmission, the 33 bit sub-blocks are interleaved to further reduce loss of data, as shown in Table 3, where sub-blocks A and B of Table 2 correspond to the first group of 30 bits, sub-blocks C and D, correspond to the second group of 30 bits, etc. The total message is 53 hops where each hop is 180 msec in length making the duration of a single message 9.54 seconds.

TABLE 1

Remote Mobile Unit Message Format

Preamble is 165 bits (33 bits × 5 hops)
Message is 512 transmitted bits
(Message is 90 bits actual data)

 = One Frequency Hop

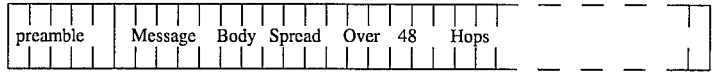

Outer Message Coding

Each of the three groups of message data (30 bits each) are BCH encoded using a standard 30,63 BCH code and with a single parity bit added to form a 64-bit word. This encoding decreases the error rate from $10^2$ to $10^{-5}$. This encoding, documented and understood by those skilled in the art, can correct up to 6 errors or detect up to 13 errors. Detection of corruption of a data word that cannot be reconstructed will cause the base to request a second transmission of the acknowledgement message.

TABLE 2

Interleaving Format for Sub-block

A = 1 reference bit and 32 data bits = 33 bits
B = 1 reference bit and 32 data bits = 33 bits

 = One Frequency Hop

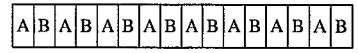

TABLE 3

Inner Coding and Interleaving of Sub-blocks

A = first 33 bits of 1st block
B = second 33 bits of 1st block
C = first 33 bits of 2nd block
D = second 33 bits of 2nd block
E = first 33 bits of 3rd block
F = second 33 bits of 3rd block

 = One Frequency Hop

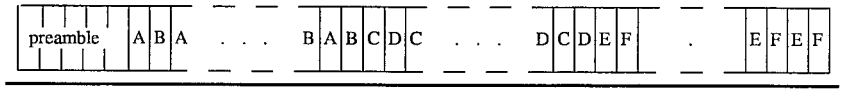

Those skilled in the art will readily recognize that a wide variety of data interleaving may be utilized to effect better error tolerance and may be substituted for the interleaving described here. Such alternate substitute interleaving means are CIRC (Cross Interleaved Reed Solomon Code) used in CD (Compact Disc) recording media operating either at the block level or at the bit level.

Single Hop Format

The acknowledgment signals are transmitted by the remote mobile units 100 in a 1.5 MHz band selected from within the 902–928 MHz spectrum The 1.5 Mhz band is divided into 7.5 KHz channels to provide 200 channels available in which the frequency hops can occur. Thus, each frequency hop is a channel 7.5 KHz wide in which a carrier frequency is transmitted. For example, channel one will have a frequency F1 at 902.000000 MHz±3.25 KHz, channel two will have its center carrier frequency at 902.007500 MHz±3 KHz, etc.

Each transmit frequency of each hop will thus be centered at the approximate mid-point of the assigned channel band; however, due to inaccuracies in the remote mobile unit circuits and reference crystals, the actual transmit frequencies will vary between units. If high quality crystals are used to accurately produce the required frequencies, very little drift off the center frequency will result. In the preferred embodiment of the present invention, low cost crystals are purposely employed to keep the per-unit manufacturing costs down. This will allow for a lower-cost product sold to the user which will increase market penetration. Thus, reference crystals are preferred which have a frequency accuracy of 3 ppm such that at 900 MHz, the statistical drift would be approximately 2700 Hz. The crystals center frequency within its nominal accuracy also drifts due to aging and temperature variations, but this drift is slow compared to the transmission times so the drift during a single transmission due to these latter variants is unimportant.

A single frequency hop is shown in Table 4. The 15 millisecond guard time preceding each hop is primarily a settling time for the oscillator circuits of the remote mobile units to allow the internal oscillator circuit to lock onto the new frequency between hops. Each hop is transmitted at a single frequency in which the phase of the carrier is either at 0 degrees phase or 180 degrees phase in reference to the phase of the reference bit immediately following the quiet or guard time. Thus the first bit is a phase reference bit followed by 32 data bits exhibiting either zero phase shift or 180 degree phase shift to encode the data bits as DBPSK (Differential Bi-Phase Shift Keying). In an alternative implementation, each frequency hop may be modulated using Frequency Shift Keying (FSK) in which two frequencies are used to transmit data bits. One hop frequency may indicate a logical one while a second hop frequency may indicate a logical zero. The frequency shift is minor and the frequency differential is contained within a single hop channel.

Each bit of DBPSK or FSK is a transmission of approximately 5 milliseconds of the hop carrier frequency either in phase with the reference bit transmission or 180 degrees out of phase. Each actual bit is approximately 4.7 milliseconds of carrier at the hop frequency preceded and followed by approximately 0.15 milliseconds of quiet guard band to reduce discontinuities between phase changes which contribute to step-function noise in the transmission.

TABLE 4

Single Frequency Hop Format

Guard time (quiet) = 15 ms
Single Bit = 5 ms of carrier DBPSK / FSK
33 Bits plus guard time = 180 ms

| 15 ms Guard Time | 5 ms Ref Bit | 5 ms 1st Bit | 5 ms 2nd Bit | 5 ms 3rd Bit | — — — | 5 ms 31st Bit | 5 ms 32nd Bit |

Frequency Hopping Sequence

All of the remote mobile units in the market serviced by the reverse paging terminal for message or location finding use the same pseudo random noise code to determine the frequency hops. The pseudo random noise code is a digital code which is repeating after approximately 1,000 unique codes. In the preferred embodiment of the present invention, the pseudo random noise code is stored in memory of each of the remote mobile units. Those skilled in the art will readily recognize, however, that a linear feedback shift register could be used to generate the pseudo random noise code on a real-time basis instead of using a look-up table which is presently in the preferred embodiment.

The PN (pseudo-random noise) code list is stored in memory and maps to a frequency list. In the preferred embodiment of the present invention, the PN code list has 1,000 entries which repeat as a sequence. The control means of the reverse paging units continuously maintain a count of the proper location within this list for the exact time of day. As described below, the time of day for all remote mobile units in the market served by the base terminal are periodically synchronized to ensure acknowledgment messages are synchronized to transmit the hop frequency at the proper time and to synchronize the location within the PN code list that each remote mobile unit will use to transmit.

The 1,000 member PN code list maps to a 200 member frequency list. In order to allow a large number of remote mobile units to simultaneously operate in the same geographic market, the remote mobile units are divided into groups and the groups are assigned different sequence segment locations in the same 1,000 member PN list. Thus a remote mobile unit from group one will begin transmitting a hop at a frequency determined from a first location with the PN code, while a remote mobile unit from group two may begin transmitting a hop at a frequency determined from a second location in the PN code. The remote mobile units from group one and group two will complete their respective acknowledgement messages in 53 hops. Preferably, the sequence of the PN code used to determine the frequencies of the 53 hops for the remote mobile unit of the first group will not overlap the sequence of the PN code used to determine the frequencies of the 53 hops for the remote mobile unit of the second group. More preferable, the frequencies chosen based on the non-overlapping segments of the PN code list are orthogonal such that the same frequency is never used by two remote mobile units belonging to different groups.

In the preferred implementation, the 1,000 member PN code list is divided into 160 hopping sequences. The remote paging units are divided into 40 groups with the members of each group synchronized to track the same location in the PN code list. The microcontroller of each remote mobile unit, regardless of its group membership, continuously runs through the repeating PN code sequence to stay in synchronization with the base unit and all other remote mobile units. Each group of remote mobile units is further divided into four subgroups such that the remote mobile units within each subgroup are assigned one sequence within the PN code list. Although the 53 hop sequence needed for each acknowledgement transmission may overlap the 53 hop sequence used by a remote mobile unit in another subgroup, the transmission sequences of a remote mobile unit of one group is chosen to not overlap the 53 hop sequence used by a remote mobile unit in another group.

Base Station Design

As described in the parent patent application, the analysis and decoding of the signals received by the base stations from the remote mobile units is done almost entirely in the digital domain. The carrier frequencies of the frequency hops are down-converted to a lower frequency in each base station and are then digitally sampled. The digital samples are then processed to locate the phase information of interest for direction finding and message decoding. Each base station is constructed with a plurality of digital signal processor pipelines which enable simultaneous message decoding and direction finding of a plurality of simultaneously transmitting remote mobile units.

Figure 4:
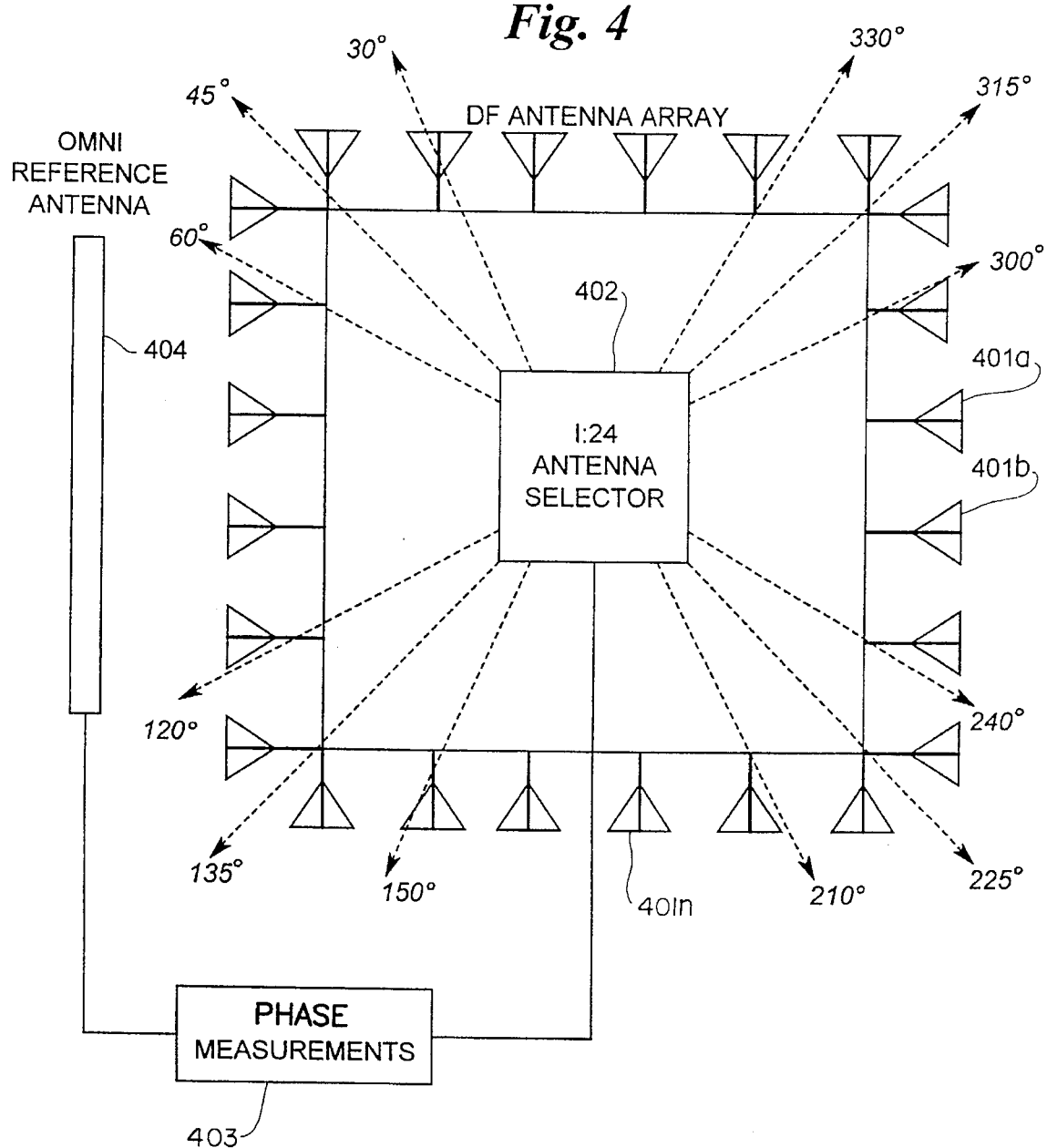
FIG. 4 is a diagram of the receiving antennas of the base stations including a plurality of dipole antennas and a single reference omni antenna.

As shown in FIG. 4, the receiving antennas of the base stations are constructed using a plurality of dipole antennas 401a, 401b, though 401n (generally referred to as 401) arranged in an array, as shown in FIG. 4 and a single reference omni antenna 404. The omni antenna 404 is not necessary for the preferred embodiment of the present invention since any one of the dipole antennas of FIG. 4 may act as a reference antenna for any of the other antennas. The omni reference antenna 404 is used as a reference antenna because the omni antenna 404 exists as part of the reverse paging infrastructure upon which the present invention relies and is used for receiving the messages from the remote mobile units.

In the preferred embodiment of the present invention, the direction finding (DF) antennas of each base station uses twenty-four sector direction finding dipole antennas 401 arranged in four linear arrays as shown diagrammatically in FIG. 4. Each of the four linear arrays consists of six dipole antennas. The phase between the antennas is measured indirectly—each instant of time one of the 24 antennas is selected and its phase is compared to the omni antenna.

The switching of the antennas is done every one bit (5 milliseconds) of every frequency hop and is synchronized to the incoming data. The switching occurs at the 0.7 millisecond gap between the transmission of the bits. The antennas 401 are continuously scanned since there could be many remote mobile units transmitting simultaneously from different directions. Differentiating between the various simultaneously transmitting remote mobile units is capable. If the simultaneously transmitting remote mobile units belong to different groups, they will be using orthogonal frequencies because they are using different sequences in the PN code. If the simultaneously transmitting remote mobile units belong to the same group, they are nonetheless distinguishable due to the particular unique frequency offsets caused by the frequency drift off center frequency of the transmitter reference crystal. As described in the above referenced parent application, the simultaneously received signals may be transmitted within the same 7.5 KHz channel during a hopping sequence of remote mobile units from the same group, but the base stations are capable of distinguishing and tracking the hops of the simultaneously transmitting remote mobile units. This is due to the resolution of the Fast Fourier Transforms (200 Hz bins) used in the pipelined receivers, the narrow frequency skirt of the transmitters in the remote mobile units and the drift tracking performed in the base stations which can distinguish the unique transmission signatures of the simultaneously transmitting remote mobile units.

The direction finding process, described more fully below, compare the exact phase amplitudes of each of the dipole antennas of the four arrays to the phase amplitude at the reference antenna. In the antenna array shown in FIG. 4, a circle surrounding the array is divided into eight sectors. The actual direction computation is done in the sectors according to Table 5.

TABLE 5

| Sector Allocation on the DF Antenna Array | |
|---|---|
| 30° to 60° | top and left arrays |
| 60° to 120° | left array |
| 120° to 150° | left and bottom array |
| 150° to 210° | bottom array |
| 210° to 240° | bottom and right array |
| 240° to 300° | right array |
| 300° to 330° | right and top array |
| 330° to 30° | top array |

Those skilled in the art will readily recognize that the whole direction finding array does not have to be installed in a single location. For instance, each linear array of six dipole antennas could be installed on a different face of roof of a high rise building. In some cases a remote mobile unit cannot transmit from specific sector. For instance one of the sectors faces the sea. In that case the direction finding array could be reduced, and only a single direction finding antenna will be installed at that sector. Usually the interferometer does not operate in case that a remote mobile unit is very close to the base station (less than 1 kilometer). In such a condition, the other base stations will still perform the direction finding and the central site will still be able to perform the triangulation.

For the reasons exemplified more fully below, the spacing of the six dipole antennas in each of the four sides of the array is critical to maintaining a low degree of ambiguity in direction finding and multi-path rejection. The base ratios of the base lines was found by simulations with several relative prime numbers and is selected to be 6:10:4:3:5 to produce a phase gain PG=56π. The ratio was computed through extensive simulations. Although the spacing between the various antenna is critical to accurate determination of the incident angle of the carrier, the order of the spacing of the antennas in the array is not critical. The order chosen here was based primarily upon a physical implementation consideration that the array frame be mechanically balanced.

Interferometric Direction Finding

The direction finding technique used in the preferred embodiment of the present invention is performed by measuring the electrical phase difference between the antenna of the array caused by the angle of the incoming wavefront of the spread spectrum frequency hopped signal. In ideal conditions where there is no multi-path disruptions of the wavefront, the incoming wave from the remote mobile unit is coming in angle of θ from the perpendicular line to the base line on which the antennas are mounted.

Figure 5:
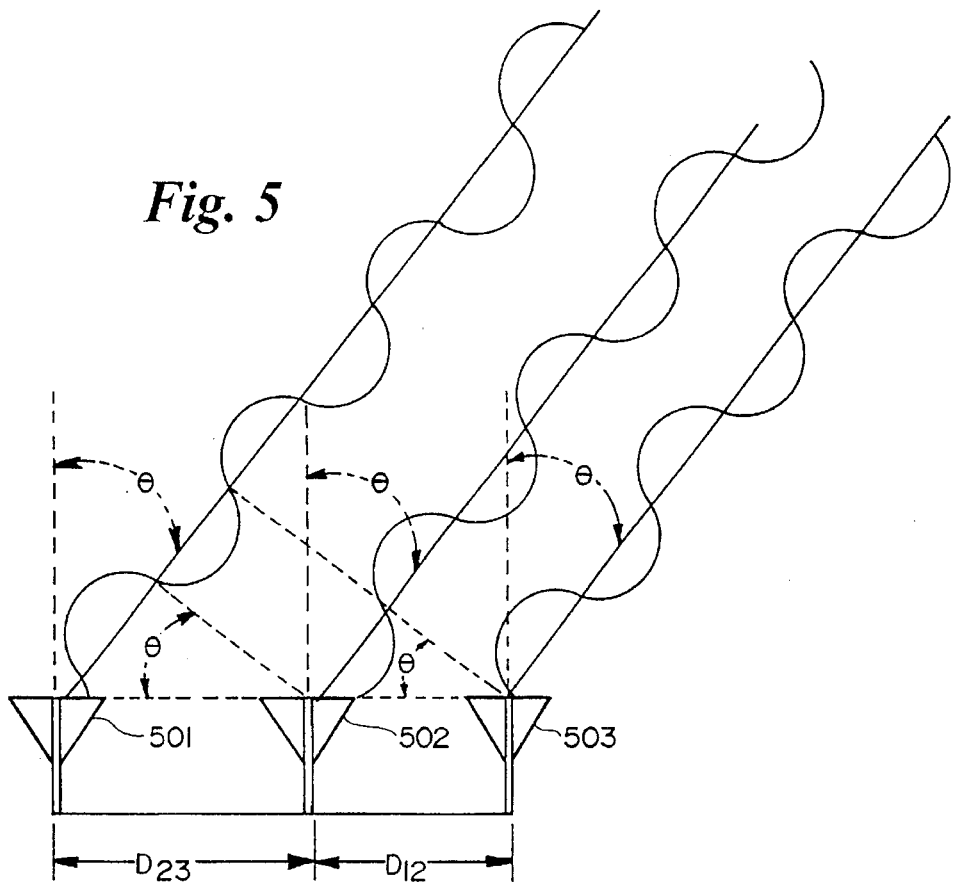
FIG. 5 is a three antenna array for an interferometric direction finding system.

FIG. 5 is an example of how the interferometric direction finding technique of the preferred embodiment of the present invention is practiced. FIG. 5 shows, by way of example and not by limitation, only three antennas of the array. The three antennas are used to determine phase differences of the incoming signals between pairs of the antenna. As described above, the phase difference may also be measured between each antenna and a reference antenna such as the omni antenna.

The interferometer direction finding (DF) technique calculates the direction of arrival of the wavefront by measuring the phase of the incoming wave front in several places in space. This interferometric method is a planar interferometric method which assumes that the antenna array and the transmitting remote mobile unit are all in the same relative plane. Differences in height of the remote mobile unit and the antenna array are ignore and cause little error in the direction finding of the present invention.

As seen from FIG. 5, the three antenna 501, 502 and 503 are irregularly spaced such that distance $D_{23}$ between antennas 501 and 502 is great than distance $D_{12}$ between antennas 502 and 503. The distance between the antennas is selected to be a multiple of a prime number sequence to ensure an irregular spacing of all antennas in the array which increases the probability that an electrical phase difference will always be measured between some of the antenna members of the array. The distance between the antennas is important to minimize ambiguity errors in measuring the phase of the incoming wavefront. If the antennas are spaced too widely apart, there is increased ambiguity in determining whether the phase difference of the same wavelength is being compared or whether the phase of different wavelengths are being mistakenly compared. Since the frequency hopped spread spectrum signal of the present invention is selected to operate in the 900 MHz band, the wavelength $\lambda$ of the incoming signal is approximately 30 centimeters.

Again, referring to FIG. 5, the phase difference between the two antennas 502 and 503 is know as $D_{12}$ and the formula for measuring the angle of the incoming signal is:

$$(\phi_{12}+2\pi K_{12})/2\pi = D_{12} \text{ SIN } (\theta)/\lambda \quad (1)$$

where
$\theta$ is the angle of the incoming wavefront measured from the perpendicular of the antenna array baseline,
$\phi_{12}$ is the electrical phase measured between antennas 502 and 503
$K_{12}$ is an ambiguity factor since the system is capable of measuring $\phi$ between $\pm\pi$ since the antennas could be measuring the phase difference of more than one cycle $\lambda$,
$D_{12}$ is the distance between the antennas 502 and 503, and
$\lambda$ is the wavelength of the incoming signal.
According to this formula, as long as $D_{12}$ is smaller than $\lambda/2$, the ambiguity factor $K_{12}$ equals 0. Thus the largest antenna spacing in the array is selected to be smaller that 15 centimeters.

In order to estimate the inherent instrumental error of the direction finding interferometer, the above equation can be written in a different form:

$$\text{SIN } (\theta) = (\phi_{12}+2\pi K_{12})/(2\pi D_{12}/\lambda) \quad (2)$$

Assuming that all the errors in estimating $\theta$ is due to inaccuracies in estimating $\phi$, differentiating the above equation produces:

$$\sigma(\theta) = \sigma(\phi_{12})/(2\pi D_{12} \text{ COS } (\theta)/\lambda) \quad (3)$$

where $\sigma$ is the standard deviation.

From this equation, inherent limitations in the system are determined. The electrical error is divided by the factor $2\pi D_{12}/\lambda$ which is termed the phase gain (PG) which reduces the error by the ratio between the distance and the wave length. Also, the error rapidly grows to infinity as $\theta$ approaches 90°. Thus the coverage of the present linear interferometer is limited to ±60° as shown by the division of the array into sectors described in above in conjunction with Table 5. In order to reduce the error, the phase gain must be made as large as possible and each antenna face of the antenna array of the present linear interferometer array covers only ¼ of the space. The antenna spacing in the array must have a distance smaller than $\lambda/2$ in order to resolve ambiguities.

Ambiguities in Interferometer Direction Finding

There are two types of ambiguities in interferometer DF: front to back ambiguities (the linear interferometer only covers effectively ⅓ of its surrounding area) and multiple possible solutions of the interferometer equations, in case where the distance between two antennas is greater than $\lambda/2$. This latter ambiguity is caused by measuring the phase difference between different cycles of the incoming wavefront.

The front to back ambiguity is solved in the present invention by using multiple arrays, as shown in FIG. 4. In order to cover 360°, the present invention uses four sub-arrays of six dipole antennas each, for covering 90°. The antennas in each array have a vertical beam width of 120°. The base station scans all the antennas of the array through the 1:24 antenna selector 402 and selects the proper sub-array by comparing the amplitudes received from antennas in each array. If two arrays are almost equal in amplitude (within 3 dB), then the interferometer process is done on both arrays and the direction of arrival (DOA) of the signal is computed either from both or from the proper array which is selected according to the DOA closer to its perpendicular.

The multiple cycles ambiguity is solved by using more than two antennas in each linear array. By way of example, but not by limitation, a three antenna array is as shown in FIG. 5. The distances between the antennas that are elected as $D_{12}=2*\lambda/2$ and $D_{23}=3*\lambda/2$. Using these ratios, the equation labeled (2) above becomes:

$$\text{SIN } (\theta) = \phi_{12}/2\pi + K_{12} \quad (4)$$

$$\text{SIN } (\theta) = \phi_{23}/3\pi + 2K_{23}/3 \quad (5)$$

Figure 6:
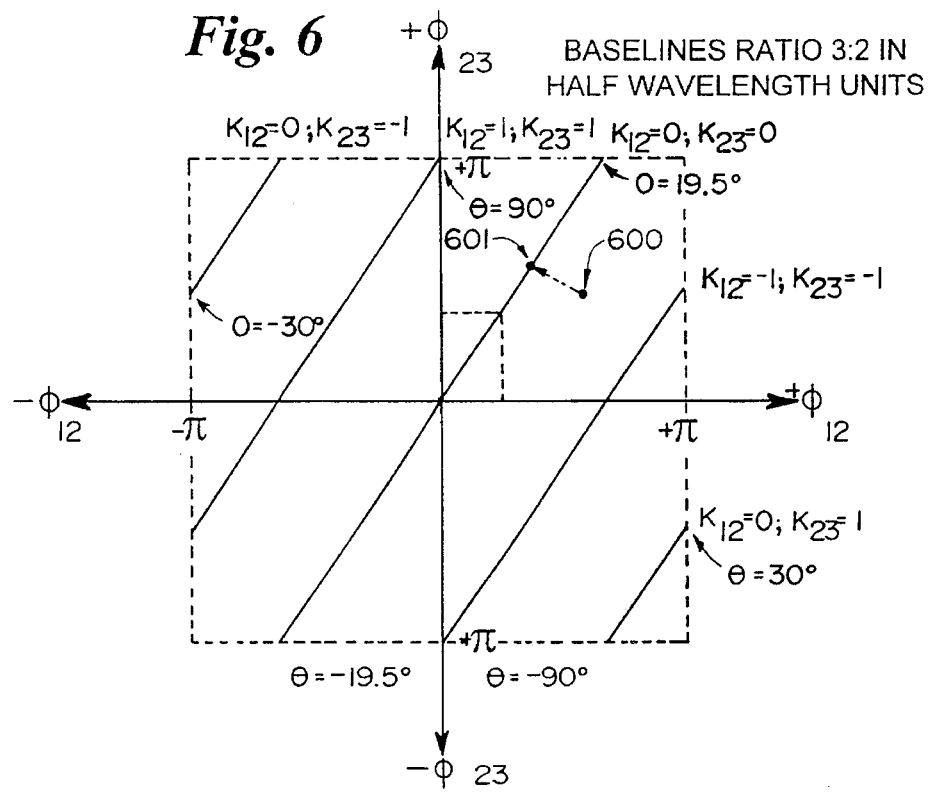
FIG. 6 is an ambiguity plane plot of the three antenna array of FIG. 5.

FIG. 6 is an ambiguity plane plot of the three antenna array of FIG. 5. FIG. 6 shows the phase difference $\phi_{12}$ plotted against the phase difference $\phi_{23}$ as an interferometer ambiguity plane plot. FIG. 6 shows a family of lines, 601, 602, 603, 604, and 605, parameterized by $K_{12}$ & $K_{23}$ with the same slope created as $\theta$ moves from 0° to ±90°. The following formula are used to create the plane plot of FIG. 6:

$$(\phi_{23}/3\pi) + 2K_{23}/3 = (\phi_{12}/2\pi) + K_{12}$$

The ambiguity resolution algorithm is as follows. The phase difference between the antennas is measured as ($\phi_{12}$ and $\phi_{23}$. On the interferometer ambiguity plane of FIG. 6, find the fine represented by $K_{12}$ and $K_{23}$ (ambiguity factors) that has the minimal distance, which is the actual probability distance, to $\phi_{12}$ and $\phi_{23}$. After solving the ambiguity, compute the exact DOA using the full span of the array i.e. 2.5λ which gives a phase gain (PG) of 5π.

One could select ratios of N:N+1 of λ/2, where N is the number of antennas in the array. This ratio of N:N+1 of λ/2 may be selected to be as large as possible in order to improve the phase gain. But as N gets larger, the distance between the ambiguity lines gets smaller and the algorithm becomes vulnerable to an error in the proper selection of $K_{12}$ and $K_{23}$. The result will be a gross error.

If the measurements distribution of φ is gaussian, then in order to compute the gross error probability, the "tail" of the gaussian distribution from the distance between the ambiguity lines to "infinity" must be computed since the phase is folding after ±π. This computation described above is only an approximation and is almost true for small values of σ(φ) which is true at high signal to noise ratio (SNR) or high signal to interference ratio. For white gaussian noise, σ(φ) could be approximated by $1/\sqrt{SNR}$ where SNR is the signal to noise ratio.

Figure 7:
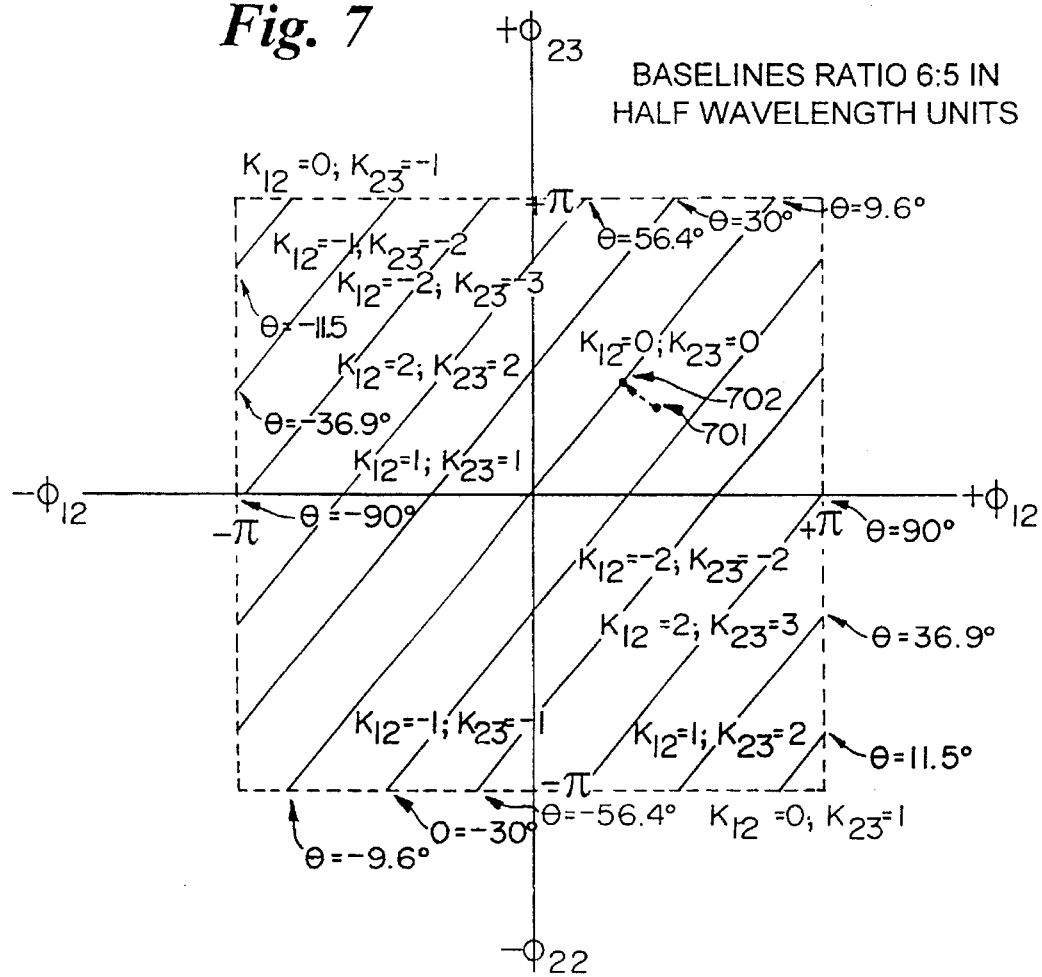
FIG. 7 is the ambiguity plane for the ratios 5:6 of $\lambda/2$ the three antenna array of FIG. 5.

FIG. 7 is the ambiguity plane for the ratios 5:6 of λ/2. The distance between the ambiguity lines became less than half compared to the ratio of 2:3 which practically increased the gross error to be impractical. Thus, the solution is to add more antennas to the array. Adding more antennas at different ratios spreads out the ambiguity lines in hyper space (multi-dimensional space) with dimension of N-1 (N—number of antennas in the array) and increases the distance between them. In the preferred embodiment of the present invention, it was concluded that in an urban environment six antennas are required in a linear array resulting in a five dimensional plot of FIG. 6 (which is incapable of being shown in a drawing). The following formula are used to create the plane plot of FIG. 7 which is an example of moving the antenna spacing closer together:

$$SIN(\theta)=(\lambda/D_{12})*(\phi_{12}+2\pi K_{12})/(2\pi)=(\phi_{12}/5\pi)+2K_{12}/5$$

$$SIN(\theta)=(\lambda/D_{23})*(\phi_{33}+2\pi K_{23})/(2\pi)=(\phi_{23}/6\pi)+K_{23}/3 \ (\phi_{23}/6\pi)+K_{23}/3=(\phi_{12}/5\pi)+2K_{12}/5$$

Multi-Path Error Sources in Interferometric Direction Finding

Figure 8:
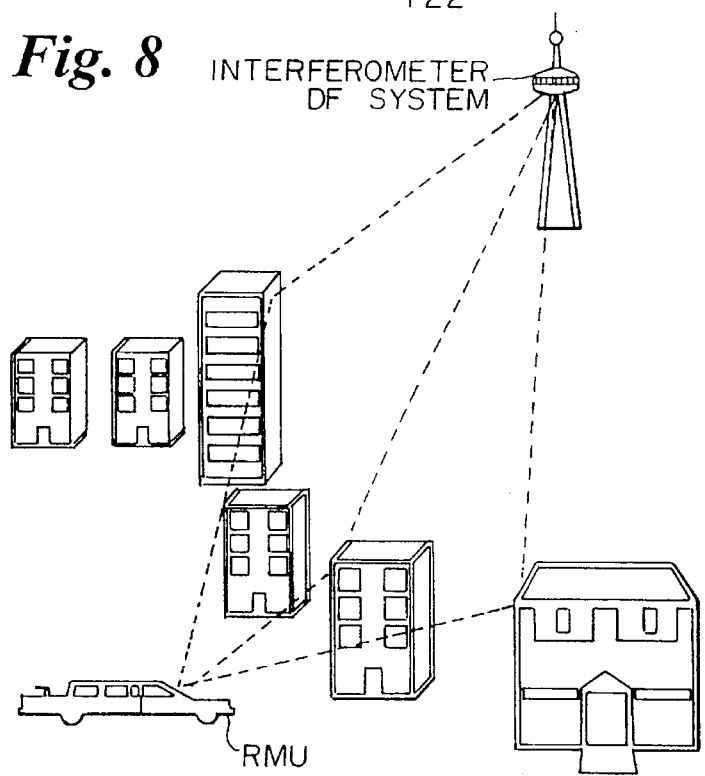
FIG. 8 is an example of multi-path reflections in an urban environment.

The preferred embodiment of the present invention provides accurate direction finding and location in urban areas. The major source of error is multipath distortion in which the incoming wave front is impaired by reflections coming from different directions. FIG. 8 is an example of multi-path reflections in an urban environment. The unique feature of frequency hopping enables the interferometer system of the present invention to distinguish between the principal reflection and other reflections. Since it is not guaranteed that a line of sight exist between the remote mobile unit and the base station due to multi-path reflections, the most consistent reflection through the hopping message is the one closest to the real bearing. Empirical testing and observations proved that the bearing error is in practice the size of the "urban block" from which the remote mobile unit transmits. In practical tests in an urban environment, the urban block size was about 75 meters in average, and up to 200 meters peak error.

Multi-Path Resistant Direction Finding Algorithm

The full direction finding algorithm relates to measurements of a linear antennas array having six dipole antennas per side of a four-sided array with a single omni reference antenna (see FIG. 4). The calculations are performed on a six antenna subarray after the sub-array is selected to be closest to the remote mobile unit as described above in conjunction with Table 5. The full interferometer formula for a six antennas sub-array is:

$$\begin{vmatrix} \phi_1 \\ \phi_2 \\ \phi_3 \\ \phi_4 \\ \phi_5 \end{vmatrix} = \frac{2\pi}{\lambda} \begin{vmatrix} D_1 \\ D_2 \\ D_3 \\ D_4 \\ D_5 \end{vmatrix} SIN(\theta) + 2\pi \begin{vmatrix} K_1 \\ K_2 \\ K_3 \\ K_4 \\ K_5 \end{vmatrix} + \begin{vmatrix} \epsilon_1 \\ \epsilon_2 \\ \epsilon_3 \\ \epsilon_4 \\ \epsilon_5 \end{vmatrix} \quad (6)$$

where $\phi_i$ is the electrical phase measured between the antennas,
$D_i$ is the distances between the antennas
λ is the wavelength
θ is the direction of arrival (DOA)
$K_i$ is the ambiguity factor, integer value such that, $$-\pi < 2\pi D_i * SIN(\theta)/\lambda + 2\pi K_i < \pi$$

$\epsilon_i$ is the additive noise (assumed to be gaussian).

To solve the equation is (6) above, linear array calculations are performed to solve the following vector values:

$$\underline{\phi} = \begin{vmatrix} \phi_1/2\pi \\ \phi_2/2\pi \\ \phi_3/2\pi \\ \phi_4/2\pi \\ \phi_5/2\pi \end{vmatrix} ; \underline{d} = \begin{vmatrix} 2D_1/\lambda \\ 2D_2/\lambda \\ 2D_3/\lambda \\ 2D_4/\lambda \\ 2D_5/\lambda \end{vmatrix} ; \underline{K} = \begin{vmatrix} K_1 \\ K_2 \\ K_3 \\ K_4 \\ K_5 \end{vmatrix} ; \underline{E} = \begin{vmatrix} \epsilon_1/2\pi \\ \epsilon_2/2\pi \\ \epsilon_3/2\pi \\ \epsilon_4/2\pi \\ \epsilon_5/2\pi \end{vmatrix} \quad (7)$$

$$X \equiv 0.5 \ SIN(\theta)$$

$$\underline{\phi} = \underline{d}X + \underline{k} + \underline{E} \rightarrow \underline{\phi} - \underline{k} = \underline{d}X + \underline{E}$$

The results of these calculations are as follows:
the vector elements $\underline{\phi}$ are limited by: $|-0.5 < \phi_i < 0.5|$;
$\underline{\phi}$ is the measurements vector and $\underline{d}$ is known;
$-0.5 < X < 0.5$; X is unknown;
$\underline{k}$ is unknown; its elements are integer, limited by the elements of $\underline{d}$
$\underline{E}$ is the noise vector that is unknown.
In the calculations, it is assumed that the noise is additive such as:

$$E\{\Phi_i \cdot \Phi_j\} = \begin{cases} 0 & i \neq j \\ \sigma^2 & i = j \end{cases} \quad (8)$$

$$E\{\epsilon_i\} = 0; \ i \in (1,2,3,4,5)$$

$$E\{\epsilon_i * \epsilon_j\} = \begin{cases} 2\sigma^2 & i = j \\ -\sigma^2 & i = j - 1 \\ -\sigma^2 & i = j + 1 \\ 0 & \text{otherwise} \end{cases}$$

$$R = COV(\underline{\phi}) = \left(\frac{\sigma}{2\pi}\right)^2 \begin{bmatrix} 2 & -1 & 0 & 0 & 0 \\ -1 & 2 & -1 & 0 & 0 \\ 0 & -1 & 2 & -1 & 0 \\ 0 & 0 & -1 & 2 & -1 \\ 0 & 0 & 0 & -1 & 2 \end{bmatrix}$$

Where:
$\Phi_i$ is the electrical phase measured at antenna i.
$\phi_i = \Phi_i - \Phi_{i+1}$ The solution to this equation is to search among all $\underline{K} \in N$, the specific $\underline{K}$ that minimizes a weighting function in a weighted least square procedure (WLS). For every $\underline{K} \in N$ we compute:

$$\hat{X}(\underline{K}) = \frac{\underline{d}^T R^{-1}}{\underline{d}^T R^{-1} \underline{d}^{-1}} (\underline{\phi} - \underline{K}) = H(\underline{\phi} - \underline{K}) \quad (9)$$

The error will be:

$$\underline{\epsilon}(\underline{K}) = \underline{\phi} - \underline{d}\hat{X}(\underline{K}) = \left( I - \frac{\underline{dd}^T R^{-1}}{\underline{d}^T R^{-1} \underline{d}^{-1}} \right)(\underline{\phi} - \underline{K}) \quad (10)$$

Weighting function:

$$C(\underline{K}) = \underline{\epsilon}^T(\underline{K}) R^{-1} \underline{\epsilon}(\underline{K}) = \quad (11)$$

$$(\underline{\phi} - \underline{K})^T \left( I - \frac{\underline{dd}^T R^{-1}}{\underline{d}^T R^{-1} \underline{d}^{-1}} \right)^T R^{-1} \left( I - \frac{\underline{dd}^T R^{-1}}{\underline{d}^T R^{-1} \underline{d}^{-1}} \right)(\underline{\phi} - \underline{K}) =$$

$$(\underline{\phi} - \underline{K})^T A (\underline{\phi} - \underline{K})$$

$$A = \left( I - \frac{\underline{dd}^T R^{-1}}{\underline{d}^T R^{-1} \underline{d}^{-1}} \right)^T R^{-1} \left( I - \frac{\underline{dd}^T R^{-1}}{\underline{d}^T R^{-1} \underline{d}^{-1}} \right)$$

Where A is 5×5 matrix. The rank of A is only 4. In order to reduce the amount of real time computation, the following computations are performed and the results stored:

$$A = F^T F$$

$$A = A_V A_Q A_V^T$$

$$[A_V A_Q] = \text{eig}(A)$$

$$F = A_Q^{1/2} A_V^T \quad (12)$$

Since the rank of A is 4, one of the eigenvalues and thus the corresponding eigenvector are 0. Matrices 4×5 and 5×4 are created and designated by a ~ over the top of the matrix identifier and thus:

$$A = \tilde{F}^T \tilde{F}$$

$$\tilde{F} = \tilde{A}_Q^{1/2} \tilde{A}_V^T \quad (13)$$

Using these values in the weighting function produces:

$$C(\underline{K}) = (\underline{\phi} - \underline{K})^T \tilde{F}^T \tilde{F} (\underline{\phi} - \underline{K}) \quad (14)$$

$$\tilde{\underline{\phi}} = \tilde{F} \underline{\phi}$$

$$\tilde{\underline{K}} = \tilde{F} \underline{K}$$

$$C(\underline{K}) = (\tilde{\underline{\phi}} - \tilde{\underline{K}})^T (\tilde{\underline{\phi}} - \tilde{\underline{K}}) = |\tilde{\underline{\phi}} - \tilde{\underline{K}}|^2$$

The full algorithm thus becomes:
Compute in off-line:
1. Compute $\tilde{F}$.
2. For all $\underline{K} \in N$ compute $\tilde{n} = \tilde{F} \underline{K}$.
3. Compute the matrix $\underline{H}$.
Compute in real time:
1. Compute:

$$\tilde{\underline{\phi}} = \tilde{F} \underline{\phi}$$

2. For all $\underline{K} \in N$, compute:

$$C(\underline{K}) = |\tilde{\underline{\phi}} - \tilde{\underline{K}}|^2$$

3. Find the best three (3) $\tilde{\underline{K}}$ that mostly minimize $C(\underline{K})$. This procedure is done for each hop.
4. Compute $X(\underline{K})$ for those $\underline{K}$ selected.
5. Compute a histogram from all the $X(\underline{K})$, using for each DOA its distance from the lines (weight) in inverse as weight.
6. Filter the histogram by passing a boxcar low-pass filter of 3° over the histogram in order to cancel small peaks in the neighborhood of a real peak.
7. Find the highest peak and the second to the highest peak.
8. Report the results.

Triangulation Process

The input to the location algorithm are reported measured directions from several base stations. Each base station reports two directions. Each direction is reported with its peak heights which is an indication of its validity. The location algorithm projects the direction of the incoming signal on a gnomonic plane tangent to earth, it filters out the false readings, and it computes the most probable location of the RMU.

Cassini UTM Projection

Figure 10:
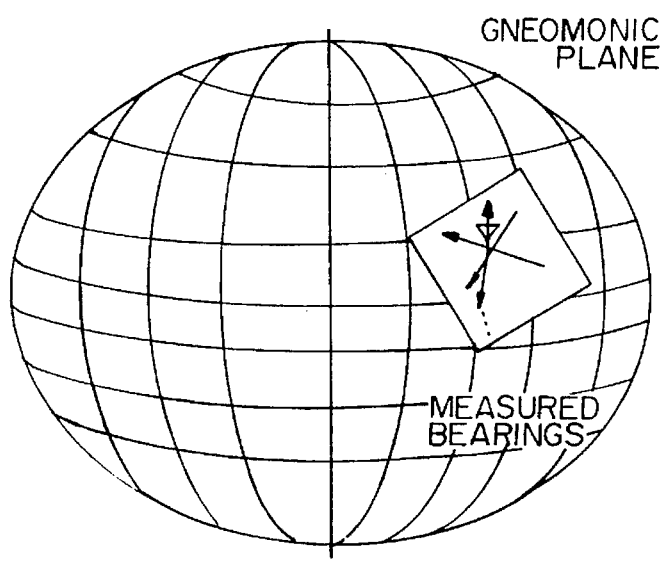
FIG. 10 is a diagram of a gnomonic plot of the measured bearings of the direction finding algorithm on a sphere.

The solution of triangulation on the earth ellipsoid is a highly non-linear problem. In order to simplify the problem, we transfer the observed data to a plane called the gnomonic plane as shown in FIG. 10. The geographic location of the base station on earth is transferred to an X-Y position on the gnomonic plane. Each measured bearing is also transferred to the gnomonic plane with a small adjustment. The estimation process is done on the plane. The estimated location of the remote mobile unit is not transferred back to an earth ellipsoid since the same plane is used for graphic display of maps using a Microsoft Windows program or the like.

The Cassini UTM projection is widely used for mapping. Its advantages are that the mapping are in the Cartesian coordinate system such that the E-W and N-S lines are orthogonal. The projection maintains approximately both the directions related to the north and the distances at radius less than 50M. The projection is very convenient for graphic display such as in the Microsoft Windows format.

The main distortion of the UTM projection is caused by the convergence of the meridian toward the north. There are two corrections that have to be made:
1. Correction of the map north to the geographical north, which is a bias correction; and
2. Small correction of the DOA (direction of arrival of the signal) according to the location of the base station.

In actual observations, the correction was actually measured together with the calibration and measurement of the pointing of the direction finding array toward the north. The calibration was performed relative to known reference point location in the covered area. To improve system accuracy, a reference transmitter having a known exact location may be used to correct the system parameters.

Direction Finding Fixing on a Plane

The fixing process input are the two DOA received from all the base stations. There are several tests performed on the results received from the BS:

If the peaks are too low, both measurements are ignored.
If the ratio between peaks is larger than 4, the second peak is ignored. The CS (Central System) computes the fix by using all the combinations from the DOA received from the base stations. Note that within one message there could be several DOAs.

The fixing process is an LMS (least mean square) process in which the most probably point is found. The most probable point is defined as the point on the plane that its sum of the squared distances from all the DOAs is minimal. The process is as follows:

The distance of a point (X,Y) from a DOA is:

$$d_i(X,Y) = (Y-Y_i)\cos(\theta_i) - (X-X_i)\sin(\theta_i) \quad (15)$$

where $(X_i, Y_i)$ are the coordinates of the base station number i.
$d_i(X, Y)$—distance of $(X, Y)$ from the DOA number i.
$\theta_i$—The angle of DOA number i from the north
$(X, Y)$—a point on the plane
(15) could be written as:

$$X_i \sin(\theta_i) - Y_i \cos(\theta_i) = X \sin(\theta_i) - Y \cos(\theta_i) + d_i \quad (16)$$

Figure 9:
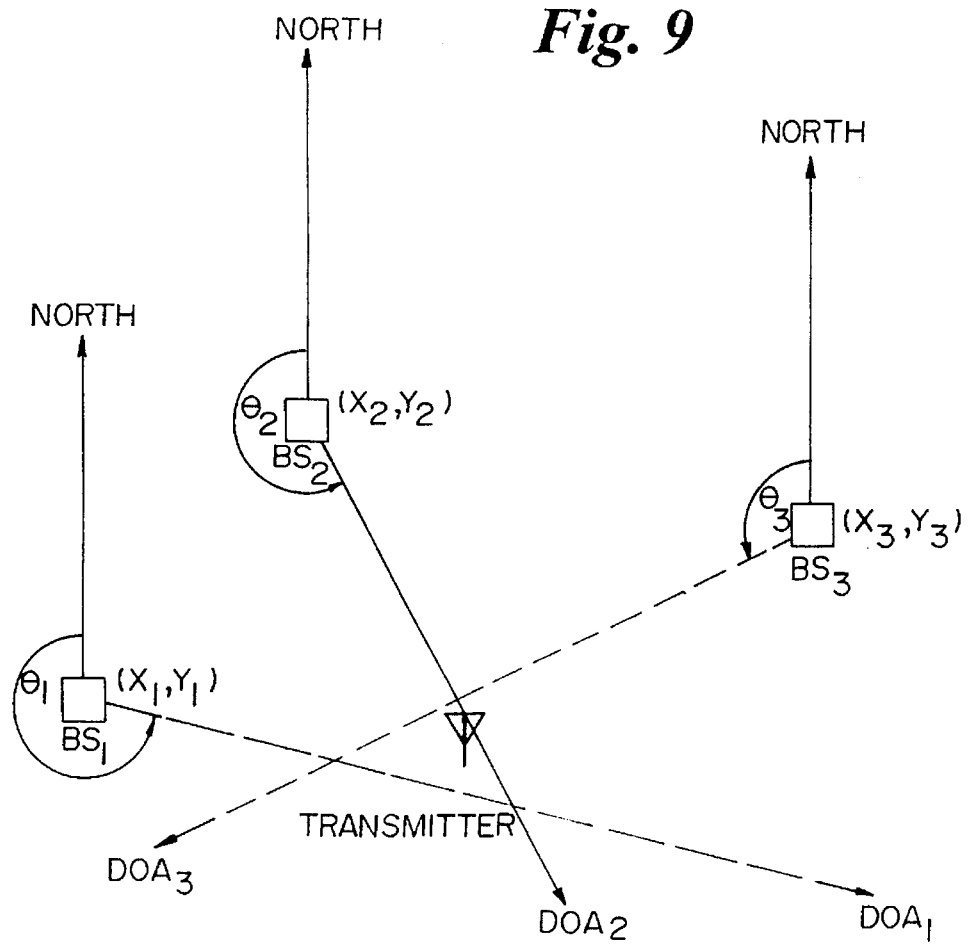
FIG. 9 is diagram showing triangulation of the location of a remote mobile unit between three base stations.

Assuming that M inputs from the base station, ($i \in \{1, \ldots, M\}$), equation (16) is written in a matrix form:

$$\begin{bmatrix} X_i \sin(\theta_i) - Y_i \cos(\theta_i) \\ \vdots \\ X_M \sin(\theta_M) - Y_M \cos(\theta_M) \end{bmatrix} = \begin{bmatrix} \sin(\theta_i) & -\cos(\theta_i) \\ \vdots & \vdots \\ \sin(\theta_M) & -\cos(\theta_M) \end{bmatrix} \begin{bmatrix} X \\ Y \end{bmatrix} + \begin{bmatrix} d_i \\ \vdots \\ d_M \end{bmatrix} \quad (17)$$

where M—number of bases, as shown in FIG. 9.

$$\underline{Z} \equiv \begin{bmatrix} X_i \sin(\theta_i) - Y_i \cos(\theta_i) \\ \vdots \\ X_M \sin(\theta_M) - Y_M \cos(\theta_M) \end{bmatrix} \quad (18)$$

$$A = \begin{bmatrix} \sin(\theta_i) & -\cos(\theta_i) \\ \vdots & \vdots \\ \sin(\theta_M) & -\cos(\theta_M) \end{bmatrix}$$

$$\underline{c} \equiv \begin{bmatrix} X \\ Y \end{bmatrix}$$

$$\underline{D} \equiv \begin{bmatrix} d_i \\ \vdots \\ d_M \end{bmatrix}$$

$$\underline{Z} = A\underline{c} + \underline{D}$$

Where:
$\underline{z}$ is a vector of M elements.
A is a matrix of M rows, 2 columns.
$\underline{c}$ is a vector of M elements.
$\underline{D}$ is a vector of M elements.

The purpose is to find $\underline{z}$ such that $\underline{D}^T\underline{D}$ will be minimized. The algorithm is LMS, as described above, and is performed by differentiating $\underline{D}^T\underline{D}$ relative to $\underline{c}$ and comparing the result to 0.

Complete Fixing Algorithm

1. Compute all intersections between all probable DOAs using (19).
2. Perform two dimensional filtering over all intersections, taking into account the power of each intersection according to the DOAs power that created that intersection. The filter size is 900×900 meters.
3. Find the an intersection from the DOA that are in the filter.

Operation Summary

In summary, and in referring once again to FIG. 6, the slope of the lines is ⅔ and the algorithm finds the closest line to the observed point 600. The most probable actual point lies on the line 601. FIG. 7 shows the use of more ambiguity lines to get better resolution of the observed point 701. The actual probable location of the observed point would be on the line at position 702 where the slope of each of the ambiguity lines is the distance between the antennas. Thus a closer spacing of the antennas shown at FIG. 7 produces less ambiguity as to the observed versus actual angle of the DOA.

The ambiguity lines shown in FIGS. 6 and 7 are for three antennas. In reality according to the matrices described above, six antennas are used in a five dimensional space which is unable to be drawn in a figure. In a five dimensional space, the observed point is located, and the nearest lines in the five dimensional space are located for the most probable actual DOA for each based station. By spreading out the spacing of the antennas, more ambiguity lines as shown in FIG. 7 are used such that antenna spacing is best spread out to minimize ambiguity.

In the based station, the observed point 701 representing DOA $\theta$ is compared to the closest three lines in a five dimensional space. A histogram is then generated based on the three lines closest to the observed point. Then a gaussian distribution of the observed $\theta$'s is computed and only the actual points 702 and five dimensional space are picked which lie within a single standard deviation. A histogram typically produces two peaks for most probable observed values. Histograms that produce more than two peaks are filtered so that only the two strongest peaks are taken as potential values. These two most probable actual values of the DOA $\theta$ are then sent to the central site for triangulation to determine the position of the transmitter.

Those skilled in the art will readily recognize that the benefit of the histogram analysis may be achieved through a less computation intensive operation known as K/m where the DOA $\theta$ most often occurring in the analysis is the most probable DOA $\theta$. A complete histogram need not be computed if instead a statistical threshold is applied in which the number of occurrences of $\theta$ exceeds a threshold value. As soon as the threshold value is reached, further analysis is halted since the most probable $\theta$ has been found.

At the central site, the two most probable $\theta$ for the two histogram peaks around a plus or minus three degree range are recorded for two, three or more base stations. Thus $2^n$ most probable points are received by the base station whereas n is equal to the number of stations. Thus if four stations are reporting, two most probable DOA $\theta$, 16 observed points are received at the central station. A spacial filter is used with a 900 by 900 meter space to determine which of the points cluster within the most probable location. Within this 900 square meter space, the most probable location is selected. Additional computation can be made by overlaying the 900 by 900 square meter space onto a map of an urban area and, for vehicle location, determining that the vehicle could only be on a street and not within a building. In actual observations, the actual location of the remote mobile unit is within a 77 square meter area.

Thus the multipath problem is solved through the use of a multidimensional ambiguity space to eliminate observed DOA values which are least probable. The use of a plurality of arrays will produce a number of observed values within the n-dimensional ambiguity space, some of which are due to the actual direction of arrival and some of which are due to multipath reflections. Since the observed values in the preferred embodiment of the present invention are the result of multiple frequencies in a frequency hopped spread spectrum system, observed values and most probable values will be calculated at various frequencies. Different frequencies observed over a period of time may be more or less susceptible to the multipath problem In addition, for a moving remote mobile trait, the doppler shift will be observed but minimized over time since only the most probable values due to the strongest signals will survive a histogram analysis. Thus the histogram analysis should be performed over a number of frequency hops over a longer period of time until the multipath signals statistically drop out. Thus only the true direction signals will survive the histogram analysis and will be passed to the central station for final analysis.

CONCLUSION

Although specific embodiments have been illustrated and described herein, it will be appreciated by those of ordinary skill in the art that any arrangement which is calculated to achieve the same purpose may be substituted for the specific embodiment shown. This application is intended to cover any adaptations or variations of the present invention. Therefore, it is manifestly intended that this invention be limited only by the claims and the equivalents thereof.

What is claimed is:

1. A mobile transmitter location system, comprising:
   a mobile transmitter having a unique identifier, and having a transmitter for sending a frequency-hopped spread spectrum carrier signal containing the unique identifier;
   a first base station having an array of irregularly spaced dipole antennas operable for receiving the frequency-hopped spread spectrum carrier signal and capable of determining a first direction of origin of the frequency-hopped spread spectrum carrier signal;
   a second base station also having an array of irregularly spaced dipole antennas operable for receiving the frequency-hopped spread spectrum carrier signal and capable of determining a second direction of origin of the frequency-hopped spread spectrum carrier signal; and
   a central station connected to the first base station and the second base station, and operable for:
   1.) receiving the first direction of origin of the frequency-hopped spread spectrum carrier signal from the first base station;
   2.) receiving the second direction of origin of the frequency-hopped spread spectrum carrier signal from the second base station;
   3.) triangulating the first direction with the second direction to determine the location.

2. The mobile location system according to claim 1 wherein a reference station operates periodically to transmit a reference frequency-hopped spread spectrum carrier signal of known origin and location to calibrate the first and second base stations and the central station.

3. The mobile location system according to claim 1 wherein the first base station and the second base station both include a reference antenna such that the phase difference of the frequency-hopped spread spectrum carrier signal between each dipole of the array of irregularly spaced dipole antennas and the reference antenna is determined.

4. The mobile location system according to claim 1 wherein the first base station and the second base station both operate to reduce the ambiguity of the direction of arrival of the incoming signal by calculating a multidimensional ambiguity space having lines indicating the only possible angles of the direction of arrival of the signal and determining the probable points of these lines which are closest to the observed value.

5. The mobile location system according to claim 4 wherein the first base station and the second base station both generate a histogram of the probable values and sending the two most probable values to the central station.

6. The mobile location system according to claim 1 wherein the central site received the most probable values from the first and second base stations and applies a spatial filter to only use the most probable values which lie within a preselected distance of the average location of all most probable values.

7. A method of locating a mobile transmitter location, comprising the steps of:
   receiving at a first base station a radio frequency signal on a plurality of irregularly spaced antennas;
   receiving at a second base station a radio frequency signal on a plurality of irregularly spaced antennas;
   calculating the observed angle of arrival of the radio frequency signal by comparing the phase difference of the radio frequency signal between pairs of the plurality of irregularly spaced antennas;
   determining the most probable angle of arrival of the radio frequency signal by comparing the observed angle of arrival to ambiguity lines in an n-dimensional space where the number of antennas is n+1;
   calculating an histogram of the most probable values and selecting the strongest most probable values;
   applying a spatial filter to the strongest most probable values from each base station and selecting the location based on the closest grouping of the strongest most probable values.

* * * * *